United States Patent
Zhu et al.

(10) Patent No.: US 11,579,423 B2
(45) Date of Patent: Feb. 14, 2023

(54) COMPACT, CATADIOPTRIC AND ATHERMAL IMAGING SPECTROMETER

(71) Applicant: SOOCHOW UNIVERSITY, Suzhou (CN)

(72) Inventors: Jiacheng Zhu, Suzhou (CN); Weimin Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 97 days.

(21) Appl. No.: 17/419,757

(22) PCT Filed: Apr. 2, 2019

(86) PCT No.: PCT/CN2019/081154
§ 371 (c)(1),
(2) Date: Jun. 30, 2021

(87) PCT Pub. No.: WO2020/140340
PCT Pub. Date: Jul. 9, 2020

(65) Prior Publication Data
US 2022/0075164 A1      Mar. 10, 2022

(30) Foreign Application Priority Data

Dec. 31, 2018   (CN) .......................... 201811650927.4

(51) Int. Cl.
*G02B 17/08*    (2006.01)
*G01J 3/14*    (2006.01)
(Continued)

(52) U.S. Cl.
CPC ............ *G02B 17/0808* (2013.01); *G01J 3/14* (2013.01); *G01J 3/18* (2013.01); *G01J 3/2823* (2013.01); *G01J 3/021* (2013.01)

(58) Field of Classification Search
CPC ...... G02B 17/0808; G01J 3/18; G01J 3/2823; G01J 3/021; G01J 3/14
See application file for complete search history.

(56) References Cited

U.S. PATENT DOCUMENTS 5,880,834 A    3/1999   Chrisp
7,330,258 B2 * 2/2008   Warren ................. G01J 3/0208
                                                356/328
(Continued)

FOREIGN PATENT DOCUMENTS

CN         1391090 A      1/2003
CN       101975611 A      2/2011
(Continued)

OTHER PUBLICATIONS

English translation of CN-1391090-A (Year: 2003).*

*Primary Examiner* — Dominic J Bologna
*Assistant Examiner* — Alima Diawara Soumare
(74) *Attorney, Agent, or Firm* — SZDC Law P.C.

(57) ABSTRACT

A compact, catadioptric and athermal imaging spectrometer is disclosed. A telecentric light (1) incident from a slit (2) is folded or refracted by an object-side prism (3) to enter a plano-convex lens (4); after being refracted by the plano-convex lens (4) and a meniscus lens (5), and refracted and reflected by a thick catadioptric lens (6), said telecentric light is incident onto a convex grating (7) in the form of a convergent beam; and after said beam is diffracted, spectral division is implemented. The divergent beam is sequentially refracted and reflected by the thick catadioptric lens (6), and refracted by the meniscus lens (5) and the plano-convex lens (4) to enter an image-side prism (8). Said beam is folded or refracted and filtered, and imaged on a focal plane (10) to realize spectral imaging.

9 Claims, 4 Drawing Sheets

(51) Int. Cl.
*G01J 3/18* (2006.01)
*G01J 3/28* (2006.01)
*G01J 3/02* (2006.01)

(56) References Cited

U.S. PATENT DOCUMENTS

2014/0118738 A1  5/2014  Comstock, II et al.
2018/0095275 A1*  4/2018  Nakajima ............ G02B 27/646

FOREIGN PATENT DOCUMENTS

| | | | | |
|---|---|---|---|---|
| CN | 103674246 A | 3/2014 | | |
| CN | 206469982 U | 9/2017 | | |
| CN | 108398186 A | 8/2018 | | |
| EP | 0862050 A2 * | 1/1998 | ........... | G09F 3/0352 292/325 |
| WO | 2016200816 A1 | 12/2016 | | |

\* cited by examiner

COMPACT, CATADIOPTRIC AND ATHERMAL IMAGING SPECTROMETER

This application is the National Stage Application of PCT/CN2019/081154, filed on Apr. 2, 2019, which claims priority to Chinese Patent Application No. 201811650927.4, filed on Dec. 31, 2018, which is incorporated by reference for all purposes as if fully set forth herein.

FIELD OF THE INVENTION

The present invention relates to a compact catadioptric and athermal imaging spectrometer suitable for large field of view, high signal-to-noise ratio and high temperature adaptabliity, which belongs to the field of imaging spectrometry.

BACKGROUND OF THE INVENTION

Spectral imaging technology is an emerging field that integrates spectral spectroscopy and spatial imaging technology. It has greatly expanded the application scope in the fields of aerospace remote sensing, agricultural and forestry resources detection, mineral resources and geological exploration, military detective and so on.

The classic structure of dispersive imaging spectrometers mainly includes: the planar grating C-T type, the convex grating Offner type, the concave grating Dyson type, etc. These kinds of spectrometers have good performance in medium and short slit and medium relative aperture. However, in the case of long slits and large relative apertures, there have large aberrations, and their spectral images is easy to be distorted, and the size of the instrument increases rapidly with the increase of slit and relative aperture. In addition, the image quality of traditional catadioptric imaging spectrometer, such as Dyson imaging spectrometer, is greatly affected by temperature, so strict temperature control system is needed to ensure its image quality stability.

The imaging spectrometer applied in the hyperspectral remote sensing field generally has high requirements on the geometric and physical parameters such as weight and volume. Excessive volume and weight lead to a sharp increase in the cost of production manufacturing and launch. Reducing the cooling equipment can greatly reduce the load pressure of the platform, which also put forward higher requirements for the temperature adaptability of the imaging spectrometer, and the imaging spectrometer is required to maintain stable image quality in a large temperature range.

In imaging spectrometers reported in the existing literature, large relative aperture, long slit, and compact structure are usually unable to meet the requirements at the same time. Referring to the literature "Design of compact Offner spectral imaging system" ([J]. OPTICS AND PRECISION ENGINEERING, 2005, 13(6):650) and "Design Method of Offner-Type Imaging Spectrometer" ([J]. Acta Optica Sinica, 2010(4):1148-1152) have reported the classic shot-slit Offner configurations. They have all-reflection structures and their slit length are both less than 20 mm. The concave grating Dyson configuration in reference "A Review of Dyson Optical System in the Measure of Infrared Imaging Spectrum" ([J]. Spectroscopy and Spectral Analysis, 2012, 32(2): 548-552) is a catadioptric spectrometer. It can achieve large relative aperture but shot slit, and its slit is hard to be longer than 20 mm. Furthermore, such spectrometer's performance is susceptible to temperature. Chinese patent CN102183304B titled "A cylindrical anastigmatic grating dispersive imaging spectrometer" and article "Aberration Correction of Czerny-Turner Imaging Spectrometer Carried by Satellite" ([J]. Acta Optica Sinica, 2009, 29(1): 35-40) have reported the plane grating Czerny-Turner configurations. They are all-reflection structures with short slit and little relative aperture and can't satisfy the requirements of large field of view and high signal-to-noise ratio for hyperspectral remote sensing applications. Therefore, it is urgent to provide an imaging spectrometer with large relative aperture, long slit, compact structure and athermal performance to satisfy the requirements of small instrument, wide swath, high spatial resolution, high signal-to-noise ratio and strong temperature adaptability for hyperspectral remote sensing applications.

SUMMARY OF THE INVENTION

Focusing on the shortcomings of the prior art, the present invention provides an imaging spectrometer for hyperspectral remote sensing, which has the characteristics of large relative aperture, long slit, high imaging quality, compact structure and strong temperature adaptability, and can satisfy the requirements of wide width, high signal-to-noise ratio, miniaturization and athermalization.

In order to achieve the above-mentioned invention purposes, the technical solution is: a compact, catadioptric and athermal imaging spectrometer, comprising: an entrance slit, an object-side prism, a plano-convex lens, a meniscus lens, a thick catadioptric lens, a convex grating, an image-side prism, a filter, and a focal plane; the exit plane of the object-side prism is glued with the plane of the plano-convex lens; the convex surface of the plano-convex lens is glued with the concave surface of the meniscus lens; the convex surface of the meniscus lens is glued with the concave surface of the thick catadioptric lens; the convex grating is directly etched on the convex surface of the meniscus lens or the convex surface of the plano convex lens; the incident plane of the image-side prism is glued with the plane of the plano-convex lens;

a telecentric lights incident from the slit, and is folded or refracted by the object-side prism into the plano-convex lens; after being refracted by the plano-convex lens and the meniscus lens, and refracted and reflected by the thick catadioptric lens, the light is then incident onto the convex grating in the form of a convergent beam; said convergent beam is diffracted by the convex grating to realize spectral splitting, and then the divergent beam is sequentially reflected by the thick catadioptric lens, refracted by the meniscus lens and the plano-convex lens, and then enters the image-side prism; said beam is folded or refracted by the image-side prism, and filtered by the filter, and imaged on the focal plane to realize spectral imaging;

the refractive index of the meniscus lens is greater than that of the plano-convex lens and that of the thick catadioptric lens; thermal expansion coefficient $\alpha_1$ of the material of the plano-convex lens, thermal expansion coefficient $\alpha_2$ of the material of meniscus lens and thermal expansion coefficient $\alpha_3$ of the material of the thick catadioptric lens are equal, or satisfy:

$$\alpha_3 = a \times \alpha_1 + b \times \alpha_2,$$

among which, a and b are proportional coefficients, the value range of a is 0.4 to 0.6, and that of b is 0.4 to 0.6.

The compact, catadioptric and athermal imaging spectrometer in the present invention, said object-side prism, said plano-convex lens and said image-side prism are of the same material.

Said object-side prism and said image-side prism are both beam folding prisms or both columnar prisms.

Said plano-convex lens, said meniscus lens, said catadioptric lens and said convex grating are set on a same optical axes.

Radius ratio of the concave surface and the convex surface of said meniscus lens is 0.75 to 0.95.

Radius ratio of the concave surface and the convex surface of said thick catadioptric lens is 0.45 to 0.55.

Said convex grating is a linear groove grating or a curved groove holographic grating.

F number of the imaging spectrometer is in a range of 1.5 to 5.

The width of the spectrometer along the slit is less than twice of the slit length.

The principle of the innovation is: Utilizing all-immersed optical path based on the Offner configuration, the imaging spectrometer has compact structure and its relative aperture is greatly enlarged. Utilizing high index meniscus lens, the problem that astigmatism of the classic Offner spectrometer increases rapidly as the slit lengthen can be improved, and long slit can be realized. After the thermal expansion coefficient of each refractive element is optimized, imaging quality of the imaging spectrometer will be stable in a large temperature range and athermalization can be realized. The imaging spectrometer is suitable for hyperspectral remote sensing applications requiring large field of view, high signal-to-noise ratio, and high temperature suitability.

Compared with the existing technology, advantages of this invention are:

1. The imaging spectrometer in this invention has long slit, which can achieve hyperspectral remote sensing images with wide swath and high spatial resolution. Moreover, it has low aberration and high fidelity.

2. The imaging spectrometer has large relative aperture, strong light collection ability and high signal-to-noise ratio. The captured spectral image has low noise and high contrast.

3. It adopts an all-immersed catadioptric structure, which makes the system very compact, and greatly reduces production and development costs. Width of the imaging spectrometer along the slit is less than twice the slit length, which is the condition for splicing of multiple spectrometers, and it can realize the field butting to meet the application of ultra-wide swath.

4. The optical elements are preferred according to their thermal expansion coefficient, which makes the system athermal, and it can maintain stable image quality over a wide temperature range.

5. The imaging spectrometer system is made of glued optical components and has no mechanical parts. Such integrated, modular component is very easy to assemble and use, and it can expand applications on the basis of a single component.

Figure 1:
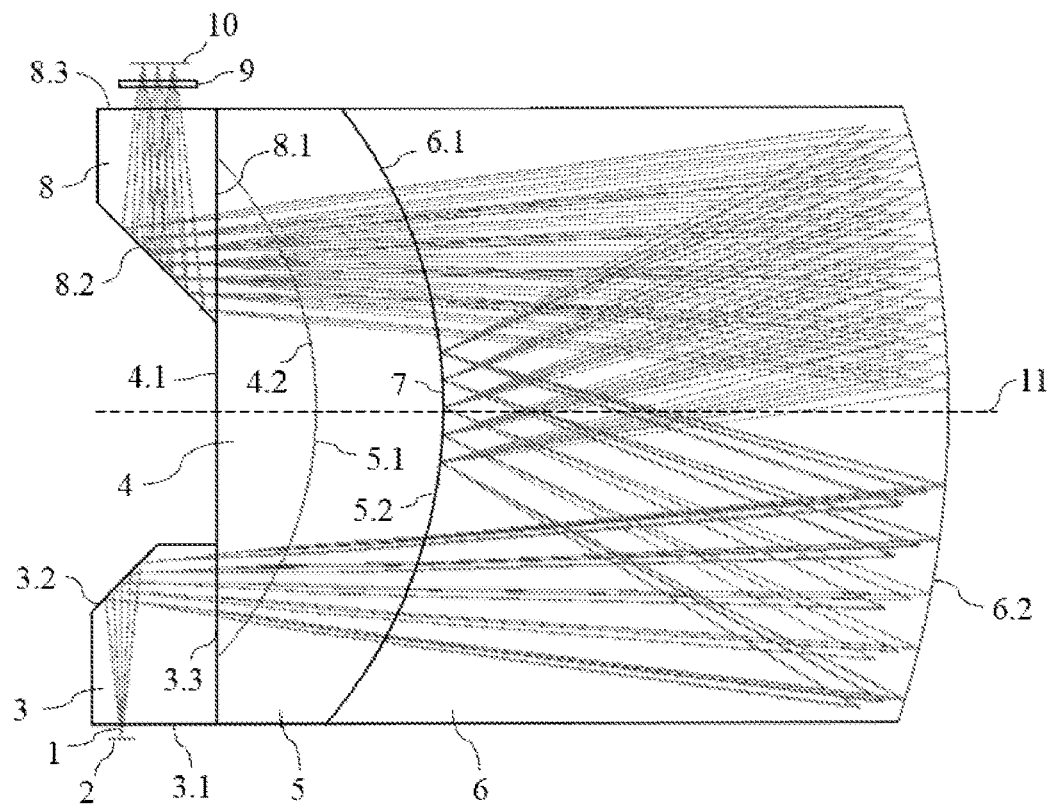
FIG. 1 is a front view of the raytrace that illustrate one embodiment of a compact catadioptric athermal imaging spectrometer of the present invention.

In the figures, 1 Incident telecentric light. 2 Entrance slit. 3 Object-side prism. 3.1 Incident surface of the object-side prism. 3.2 Reflective surface of the object-side prism. 3.3 Exit plane of the object-side prism. 4 Plano-convex lens. 4.1 Plane of the plano-convex lens. 4.2 Convex surface of the plano-convex lens. 5 Meniscus lens. 5.1 Concave surface of the meniscus lens. 5.2 Convex surface of the meniscus lens. 6 Thick catadioptric lens. 6.1 Concave surface of the thick catadioptric lens. 6.2 Convex surface of the thick catadioptric lens. 7 Convex grating. 8 Image-side prism. 8.1 Incident surface of the image-side prism. 8.2 Reflective surface of the image-side prism. 8.3 Exit plane of the image-side prism. 9 Filter. 10 Focal plane. 11 Optical axis.

DETAILED DESCRIPTION OF THE INVENTION

Referring now to the drawings, to the following detailed description, and to incorporated materials, detailed information about the invention is provided including the description of specific embodiments. The detailed description serves to explain the principles of the invention.

Embodiment 1

Figure 2:
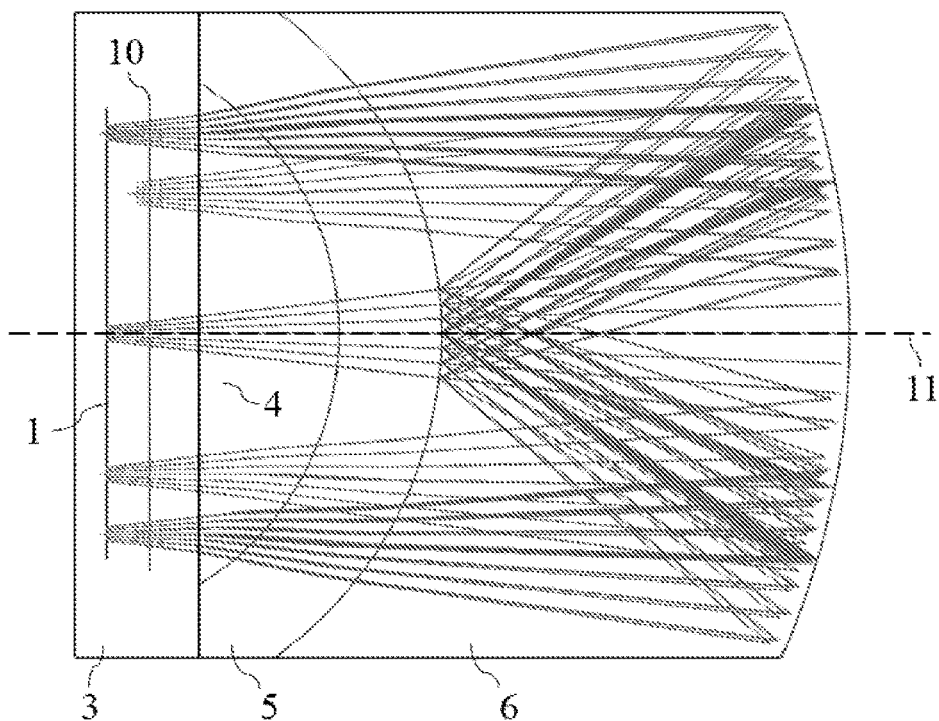
FIG. 2 is a top view of the raytrace that illustrate one embodiment of a compact catadioptric athermal imaging spectrometer of the present invention.

Referring now to FIGS. 1 and 2, they respectively are front view and top view of the raytrace that illustrate one embodiment of a compact catadioptric athermal imaging spectrometer of the present invention. The imaging spectrometer contains an entrance slit 2, an object-side prism 3, a plano-convex lens 4, a meniscus lens 5, a thick catadioptric lens 6, a convex grating 7, an image-side prism 8, a filter 9 and a FPA 10. 3.1 is the incident surface of the said object-side prism. 3.2 is the reflective surface of the said object-side prism. 3.3 is the exit plane of the said object-side prism. 4.1 is the plane of the said plano-convex lens. 4.2 is the convex surface of the said plano-convex lens. 5.1 is the concave surface of the said meniscus lens. 5.2 is the convex surface of the said meniscus lens. 6.1 is the concave surface of the said thick catadioptric lens. 6.2 is the convex surface of the said thick catadioptric lens. 8.1 is the incident surface of the said image-side prism. 8.2 is the reflective surface of the said image-side prism. 8.3 is the exit plane of the said image-side prism. Exit plane of the object-side prism 3.3 is glued to the plane of the plano-convex lens 4.1. Convex surface of the plano-convex lens 4.2 is glued to the concave surface of the meniscus lens 5.1. Convex surface of the meniscus lens 5.2 is glued to the concave surface of the thick catadioptric lens 6.1. Convex grating 7 is etched directly onto the convex surface of the meniscus lens 5.2. Incident plane of the image-side prism 8.1 is glued to the plane of the plano-convex lens 4.1. The entrance slit 2 and grating groove of the convex grating 7 both are perpendicular to paper. The telecentric light 1 is incident from the slit 2, reflected or refracted into the plano-convex lens 4 by the object-side prism 3. After refracted by the plano-convex lens 4 and the meniscus lens 5, and reflected by the thick catadioptric lens 6, the said light is then incident onto the convex grating 7 in the form of a convergent beam. The said convergent beam is diffracted by the convex grating 7, and then sequentially reflected by the thick catadioptric lens 6, refracted by the meniscus lens 5 and the plano-convex lens 4, and then enters the image-side prism 8. The said beam is reflected or refracted by the image-side prism 8, and then goes through a filter 9, and imaged on the FPA 10. The convex grating 7 is linear groove ruled grating or curved groove holographic grating. Chief ray of the central field incident to the grating and chief ray of the center field diffracted by the grating are diffracted are within the principal section of the grating, that is, the paper surface. Plano-convex lens 4, meniscus lens 5, thick catadioptric lens 6 and convex grating 7 are coaxial. Entrance slit 2 and FPA 10 are off-axis, and their off-axis amount ensure that the convex grating 7 does not block the light beams on both sides.

The related specifications of the compact catadioptric athermal imaging spectrometer provided by this embodiment are as follows.

Spectral range: 0.4 μm-1.0 μm
F number: 2.7
Slit length: 32 mm
Spectral resolution: 2.5 nm
Dispersive width on FPA: 3.6 mm
Pixel size: 15 μm×15 μm Parameters of optical elements in this embodiment are given in Table 1, including 'Surface', 'Curvature radius', 'Material' and 'Thickness'. Groove density of the convex grating 7 is 186 lp/mm.

TABLE 1

Optical parameters of the compact catadioptric athermal imaging spectrometer

| Surface | Curvature radius/mm | Material | Thickness/mm | Remark |
|---|---|---|---|---|
| 2 | ∞ | | 1.5 | Off-axis 12.2 mm |
| 3.1 | ∞ | K10 | 8 | Incident surface |
| 3.2 | ∞ | K10 | 6 | 45° folding |
| 3.3, 4.1 | ∞ | K10 | 9 | Glued surface |
| 4.2, 5.1 | −26 | H-ZK10 | 8.12 | Glued surface |
| 5.2, 6.1 | −34.2 | K10 | 33.52 | Glued surface |
| 6.2 | −64.46 | MIRROR | 33.52 | Glued surface |
| 7 | −34.2 | MIRROR | 33.52 | Convex grating |
| 6.2 | −64.46 | MIRROR | 33.52 | Reflective surface |
| 6.1, 5.2 | −34.2 | K10 | 8.12 | Glued surface |
| 5.1, 4.2 | −26 | H-ZK10 | 9 | Glued surface |
| 4.1, 8.3 | ∞ | K10 | 9 | Glued surface |
| 8.2 | ∞ | K10 | 6 | 45° folding |
| 8.3 | ∞ | K10 | 2 | Exit surface |
| 9 | ∞ | F_Silica | 2 | Filter |
| 10 | ∞ | — | 2 | Focal plane |

Referring now to FIG. 2, it is the top view of the raytrace that illustrate one embodiment of a compact catadioptric athermal imaging spectrometer of the present invention. It can be seen that the whole imaging spectrometer, including entrance slit 2 and FPA 10, is symmetrical about the optical axis 11. The imaging spectrometer has a magnification ratio of 1:1, and length of the image plane 10 in spatial dimension is equal to the length of the entrance slit 2. The imaging spectrometer's width along the slit is 59 mm, which is less than twice of the slit length.

Figure 3:
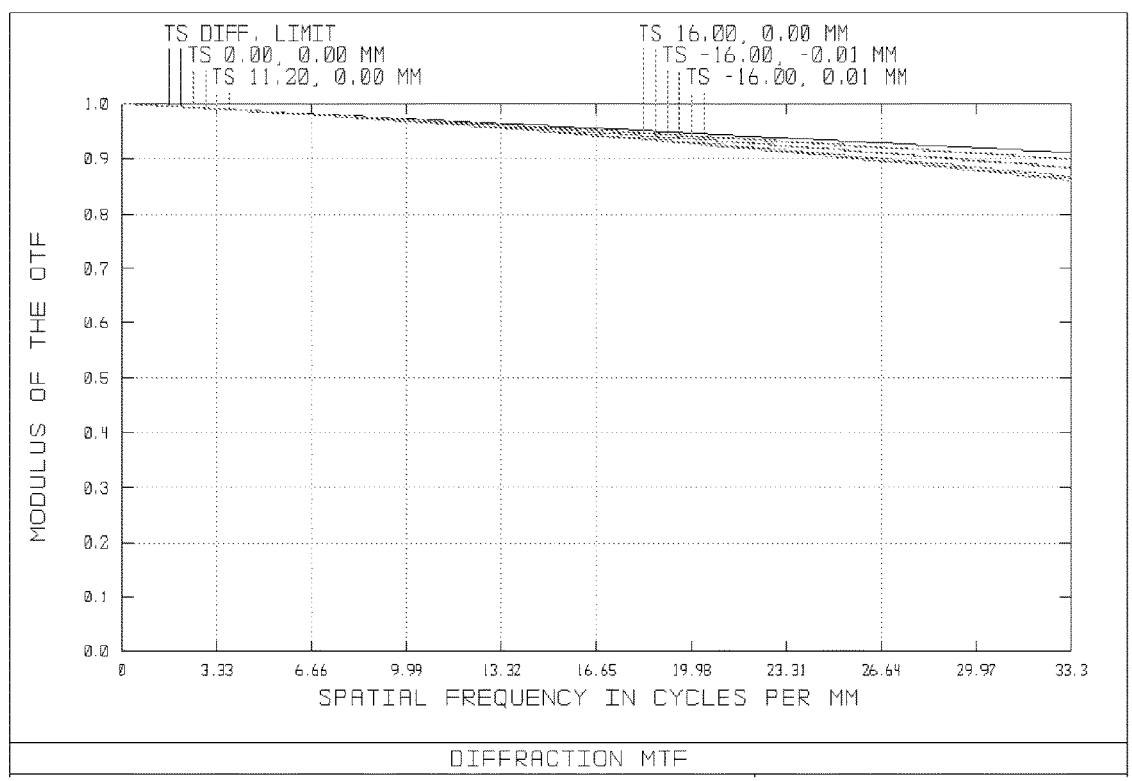
FIG. 3 is the MTF curve at −40° C. for one embodiment of a compact catadioptric athermal imaging spectrometer of the present invention.
Figure 4:
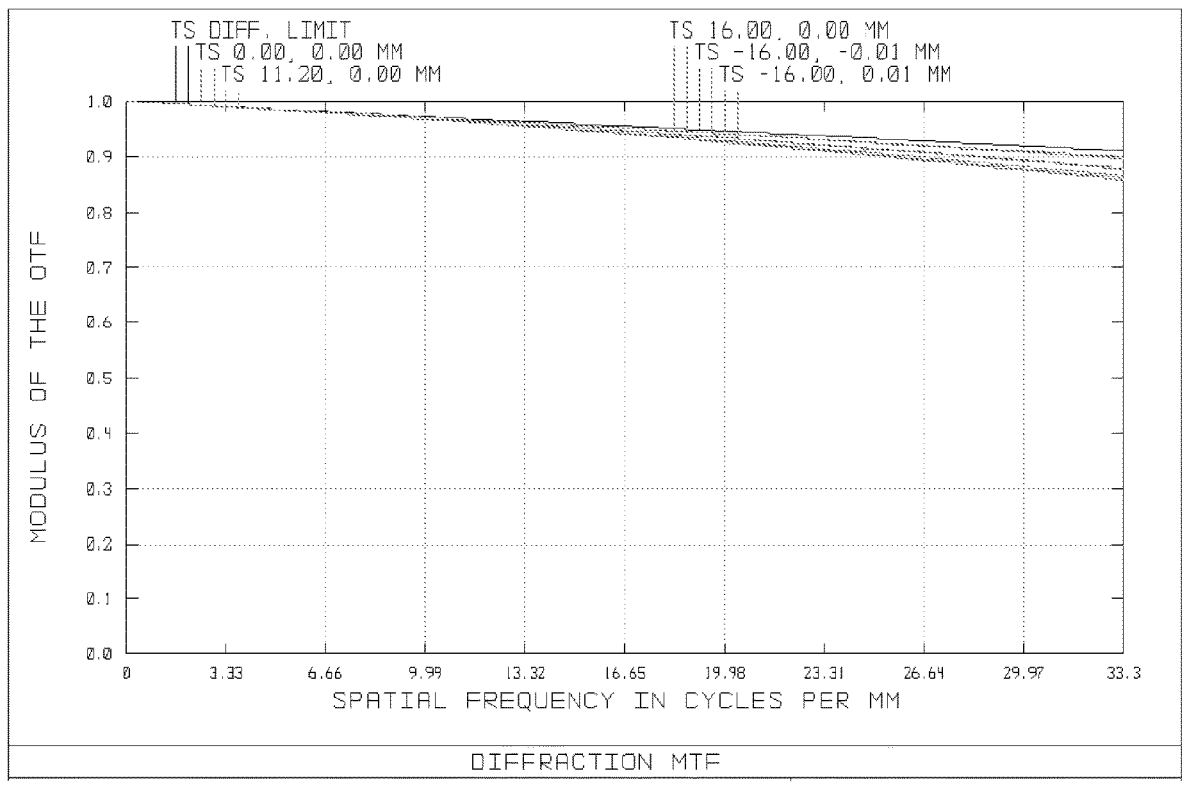
FIG. 4 is the MTF curve at 20° C. for one embodiment of a compact catadioptric athermal imaging spectrometer of the present invention.
Figure 5:
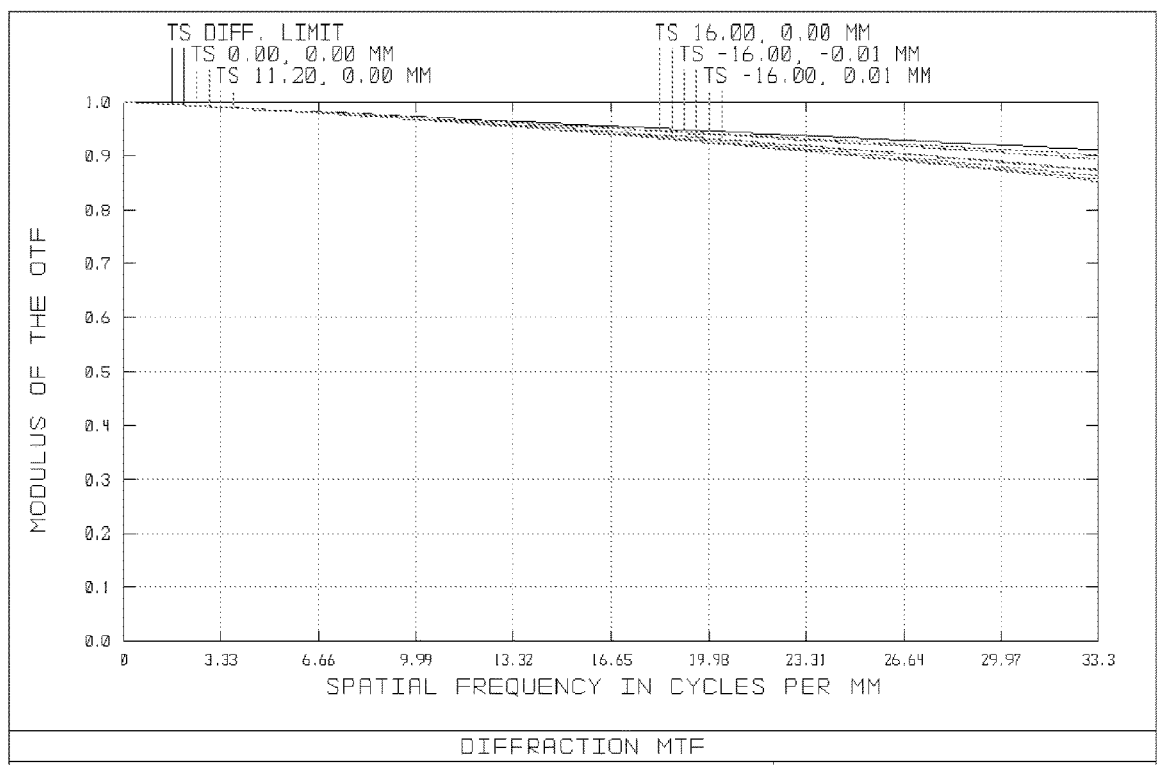
FIG. 5 is the MTF curve at 80° C. for one embodiment of a compact catadioptric athermal imaging spectrometer of the present invention.

Referring now to FIGS. 3, 4 and 5. They are MTF curves of the provided embodiment at −40° C., 20° C. and 80° C., respectively. Value of MTF at the Nyquist frequency 33.3 lp/mm is greater than 0.85, it is close to the diffraction limit. The imaging spectrometer has high imaging quality, and its performance is hardly change with the temperature, and it achieves athermal.

Figure 6:
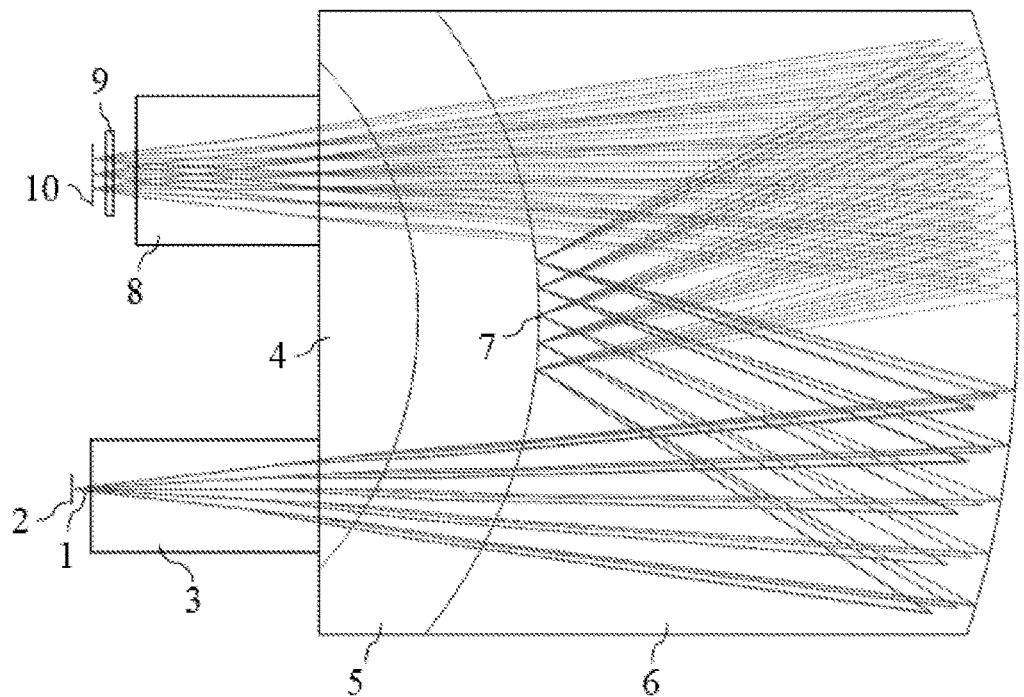
FIG. 6 is the raytrace of one embodiment of a compact catadioptric athermal imaging spectrometer of the present invention, in which object-side and image-side light path are not folded.

Referring now to FIG. 6. It is the raytrace of one embodiment of a compact catadioptric athermal imaging spectrometer of the present invention, in which object-side and image-side light path are not folded. There is an object-side prism 3 behind the slit, which is a columnar prism. There is an image-side prism 8 in front of the filter, which is a columnar prism. Plano-convex lens, meniscus lens, and thick catadioptric lens in this imaging spectrometer are the same as those in FIG. 1, and its imaging performance is the same as that of the imaging spectrometer in FIG. 1.

Embodiment 2

Figure 7:
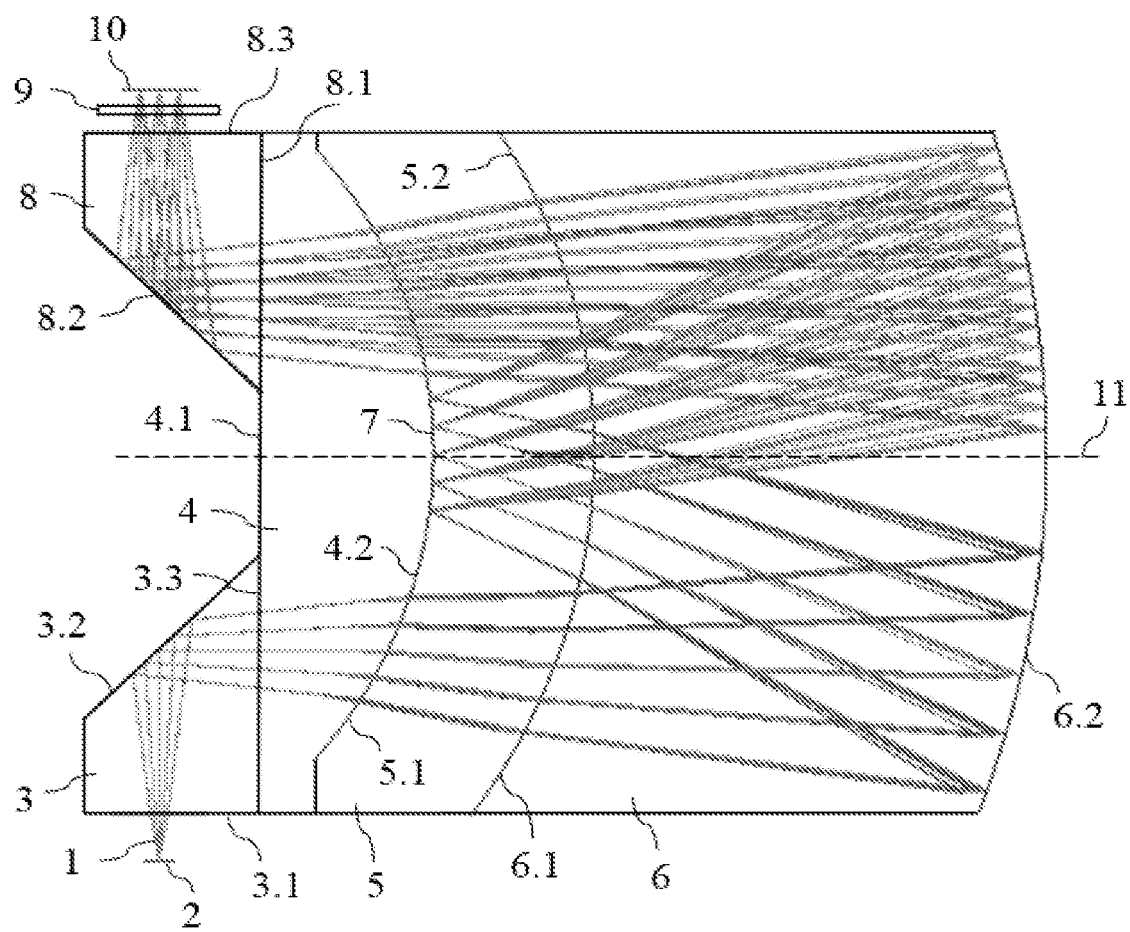
FIG. 7 is the raytrace of one embodiment of a compact catadioptric athermal imaging spectrometer of the present invention, in which the diffraction grating is etched onto the convex surface of the plano-convex lens.

Referring now to FIG. 7, it is the raytrace that illustrate one embodiment of a compact catadioptric athermal imaging spectrometer of the present invention, in which the diffraction grating is etched onto the convex surface of the plano-convex lens. The imaging spectrometer contains an entrance slit 2, an object-side prism 3, a plano-convex lens 4, a meniscus lens 5, a thick catadioptric lens 6, a convex grating 7, an image-side prism 8, a filter 9 and a FPA 10. 3.1 is the incident surface of the said object-side prism. 3.2 is the reflective surface of the said object-side prism. 3.3 is the exit plane of the said object-side prism. 4.1 is the plane of the said plano-convex lens. 4.2 is the convex surface of the said plano-convex lens. 5.1 is the concave surface of the said meniscus lens. 5.2 is the convex surface of the said meniscus lens. 6.1 is the concave surface of the said thick catadioptric lens. 6.2 is the convex surface of the said thick catadioptric lens. 8.1 is the incident surface of the said image-side prism. 8.2 is the reflective surface of the said image-side prism. 8.3 is the exit plane of the said image-side prism. Exit plane of the object-side prism 3.3 is glued to the plane of the plano-convex lens 4.1. Convex surface of the plano-convex lens 4.2 is glued to the concave surface of the meniscus lens 5.1. Convex surface of the meniscus lens 5.2 is glued to the concave surface of the thick catadioptric lens 6.1. Convex grating 7 is etched directly onto the convex surface of the plano-convex lens 4.2. Incident plane of the image-side prism 8.1 is glued to the plane of the plano-convex lens 4.1. The entrance slit 2 and grating groove of the convex grating 7 both are perpendicular to paper. The telecentric light 1 is incident from the slit 2, reflected or refracted into the plano-convex lens 4 by the object-side prism 3. After refracted by the plano-convex lens 4 and the meniscus lens 5, and reflected by the thick catadioptric lens 6, the said light is then incident into the meniscus lens 5 again, and then incident onto the convex grating 7. After diffracted by the convex grating 7, the light is then sequentially refracted by the meniscus lens 5, reflected by the thick catadioptric lens 6, refracted by the meniscus lens 5 again and refracted by the plano-convex lens 4, and then enters the image-side prism 8. The said beam is reflected or refracted by the image-side prism 8, and then goes through a filter 9, and imaged on the FPA 10. The convex grating 7 is linear groove ruled grating or curved groove holographic grating. Chief ray of the central field incident to the grating and chief ray of the center field diffracted by the grating are diffracted are within the principal section of the grating, that is, the paper surface. Plano-convex lens 4, meniscus lens 5, thick catadioptric lens 6 and convex grating 7 are coaxial. Entrance slit 2 and FPA

10 are off-axis, and their off-axis amount ensure that the convex grating 7 does not block the light beams on both sides.

The related specifications of the compact catadioptric athermal imaging spectrometer provided by this embodiment are as follows.

Spectral range: 1.0 μm-2.5 μm
F number: 2.7
Slit length: 50 mm
Spectral resolution: 5 nm
Dispersive width on FPA: 7.2 mm
Pixel size: 24 μm×24 μm Off-axis amount of the slit in this embodiment is 22.4 mm, and the distance between the slit and the object-side prism is 3 mm. Thickness of the plano-convex lens is 26 mm, and radius of its convex surface is 26.4 mm. Thickness of the meniscus lens is 11.4 mm, and radius of its convex surface is 65.2 mm. Thickness of the thick catadioptric lens is 57.3 mm, and radius of its convex surface is 122.5 mm. Groove density of the convex grating is 85 lp/mm.

What we claim is:

1. A compact, catadioptric and athermal imaging spectrometer, comprising: an entrance slit (2), an object-side prism (3), a plano-convex lens (4), a meniscus lens (5), a thick catadioptric lens (6), a convex grating (7), an image-side prism (8), a filter (9), and a focal plane (10); the exit plane (3.3) of the object-side prism (3) is glued with the plane (4.1) of the plano-convex lens (4); the convex surface (4.2) of the plano-convex lens (4) is glued with the concave surface (5.1) of the meniscus lens (5); the convex surface (5.2) of the meniscus lens (5) is glued with the concave surface of the thick catadioptric lens (6); the convex grating (7) is directly etched on the convex surface (5.2) of the meniscus lens (5) or the convex surface (4.2) of the plano convex lens (4); the incident plane (8.1) of the image-side prism (8) is glued with the plane (4.1) of the plano-convex lens (4);

a telecentric light (1) is incident from the slit (2), and is folded or refracted by the object-side prism (3) into the plano-convex lens (4); after being refracted by the plano-convex lens (4) and the meniscus lens (5), and refracted and reflected by the thick catadioptric lens (6), the light is then incident onto the convex grating (7) in the form of a convergent beam; said convergent beam is diffracted by the convex grating (7) to realize spectral splitting, and then the divergent beam is sequentially reflected by the thick catadioptric lens (6), refracted by the meniscus lens (5) and the plano-convex lens (4), and then enters the image-side prism (8); said beam is folded or refracted by the image-side prism (8), and filtered by the filter (9), and imaged on the focal plane (10) to realize spectral imaging;

the refractive index of the meniscus lens (5) is greater than that of the plano-convex lens (4) and that of the thick catadioptric lens (6); thermal expansion coefficient $\alpha_1$ of the material of the plano-convex lens (4), thermal expansion coefficient $\alpha_2$ of the material of meniscus lens (5) and thermal expansion coefficient $\alpha_3$ of the material of the thick catadioptric lens (6) are equal, or satisfy:

$$\alpha_3 = a \times \alpha_1 + b \times \alpha_2,$$

among which, a and b are proportional coefficients, the value range of a is 0.4 to 0.6, and that of b is 0.4 to 0.6.

2. The compact, catadioptric and athermal imaging spectrometer according to claim 1, wherein said object-side prism (3), said plano-convex lens (4) and said image-side prism (8) are of the same material.

3. The compact, catadioptric and athermal imaging spectrometer according to claim 1, wherein said object-side prism (3) and said image-side prism (8) are both beam folding prisms or both columnar prisms.

4. The compact, catadioptric and athermal imaging spectrometer according to claim 1, wherein said plano-convex lens (4), said meniscus lens (5), said catadioptric lens (6) and said convex grating (7) are set on a same optical axes (11).

5. The compact, catadioptric and athermal imaging spectrometer according to claim 1, wherein radius ratio of the concave surface (5.1) and the convex surface (5.2) of said meniscus lens (5) is 0.75 to 0.95.

6. The compact, catadioptric and athermal imaging spectrometer according to claim 1, wherein radius ratio of the concave surface (6.1) and the convex surface (6.2) of said thick catadioptric lens (6) is 0.45 to 0.55.

7. The compact, catadioptric and athermal imaging spectrometer according to claim 1, wherein said convex grating (7) is a linear groove grating or a curved groove holographic grating.

8. The compact, catadioptric and athermal imaging spectrometer according to claim 1, wherein F number of the imaging spectrometer is in a range of 1.5 to 5.

9. The compact, catadioptric and athermal imaging spectrometer according to claim 1, wherein the width of the spectrometer along the slit is less than twice of the slit length.

\* \* \* \* \*